United States Patent [19]

Gorden et al.

[11] 4,336,486
[45] Jun. 22, 1982

[54] DYNAMOELECTRIC MACHINES BRUSHLESS SUPPLEMENTAL EXCITATION SYSTEM

[75] Inventors: Dale I. Gorden, Pittsburgh; Sigrud R. Petersen, North Huntingdon, both of Pa.

[73] Assignee: Westinghouse Electric Corp., Pittsburgh, Pa.

[21] Appl. No.: 110,570

[22] Filed: Jan. 9, 1980

[51] Int. Cl.³ .......................... H02P 9/14; H02P 9/30
[52] U.S. Cl. ........................................ 322/63; 322/72; 322/86; 322/87
[58] Field of Search ...................... 322/17, 59, 60, 63, 322/72, 86, 87, 88, 44, 45

[56] References Cited

U.S. PATENT DOCUMENTS

| 2,608,680 | 8/1952 | Shankle et al. | 322/86 |
| 2,752,554 | 6/1956 | Abell | 322/86 |
| 2,888,621 | 5/1959 | McLane | 322/86 |
| 3,072,840 | 1/1963 | Sones | 322/17 |
| 3,863,137 | 1/1975 | Mishima et al. | 322/87 |
| 4,032,835 | 6/1977 | Finnell et al. | 322/59 |

Primary Examiner—Robert J. Hickey
Attorney, Agent, or Firm—William D. Lanyi

[57] ABSTRACT

For a dynamoelectric machine, excitation power is supplied by a main exciter having two field windings. A first field winding is driven by a pilot exciter which supplies base excitation (small signal) for the main exciter. Forcing excitation (large signal) is supplied by the second field winding which is driven by an external, supplemental power source. The main exciter can thus provide the appropriate excitation for both normal and transient operating conditions. In addition, by switching the controlled rectifier elements associated with the supplemental power source, the second field winding is also capable of providing fast de-excitation for the main exciter.

7 Claims, 9 Drawing Figures

DYNAMOELECTRIC MACHINES BRUSHLESS SUPPLEMENTAL EXCITATION SYSTEM

BACKGROUND OF THE INVENTION

The present invention relates to an excitation system for a synchronous dynamoelectric machine, and more particularly to means for supplementing the excitation provided by a conventional brushless exciter for a synchronous generator.

Brushless excitation systems are now widely used for supplying direct current field excitation to synchronous dynamoelectric machines such as large alternating current generators. Such brushless excitation systems include an alternating current exciter having a stationary field structure and a rotating armature member. A rotating rectifier assembly is carried on a common shaft with the exciter armature, and is connected thereto to provide a direct current output. The output of the rectifier is connected to the field winding of the main generator which also rotates with the exciter armature and rectifier. In this way an excitation system is provided which requires no sliding contacts.

In conventional arrangements, the main exciter for a synchronous generator comprises an alternating current generator having its armature mounted on the same shaft as the field winding of the synchronous machine, and also having a stator field winding which must be energized by direct current to create a magnetic field so that a voltage will be induced in the rotating armature of the exciter. In well-known arrangements, the direct current excitation for the main exciter is provided by a pilot exciter having a permanent magnet rotor turned by the prime mover, and an annular armature winding which produces excitation power for the main exciter. Means such as a rectifier circuit is ordinarily provided to convert the alternating current output of the pilot exciter to direct current for the main exciter field excitation.

The basic brushless excitation arrangement has proven to be satisfactory in providing base excitation for rated voltage output, and for providing forcing excitation for nominal speed of response levels.

However, there is an increasing demand for synchronous generator systems having a speed of response, i.e., time rate of change of voltage output, of 2.5–3.5. It has been a practice to increase the size of the permanent magnet in the pilot exciter to obtain sufficient forcing power to the main exciter field to achieve a faster speed of response. The speed of response of the synchronous generator is directly proportional to the strength of the magnetic field of the permanent magnet pilot generator, which is, in turn, directly proportional to the mass of the permanent magnet rotor assembly. Thus, in order to achieve higher levels of speed of response, a larger pilot exciter assembly must be provided. However, this may require a basic change in the mechanical arrangement of the brushless exciter system because of space limitations. The size of the permanent magnet generator's rotor must be increased greatly to achieve a significant increase in the magnetic field output of the permanent magnetic rotor. On some operating machines, a blower located on the permanent magnet hub of the pilot exciter is presently extended to its maximum diameter consistent with permissible dynamic loading. Furthermore, even if no blower were required, a larger permanent magnet assembly would require larger bearings and a stronger supporting structure.

It can now be seen that there exists a need for means operable to supplement the excitation provided by the conventional brushless exciter; one which provides a faster speed of response without increasing the size of the permanent magnet assembly of the pilot exciter.

One such supplemental exciter arrangement was described in U.S. Pat. No. 4,032,835 issued on June 28, 1977 to L. W. Finnell, S. R. Petersen and D. I. Gorden, and having a common assignee with the present invention. The present invention is an improvement on that design.

SUMMARY OF THE INVENTION

The present invention involves a synchronous dynamoelectric machine having a stator member carrying an alternating current armature winding and a rotor member carrying a direct current field winding. A main exciter is provided for supplying base excitation to the synchronous machine. This main exciter has a rotor member carrying an armature winding and a stator member which carries two windings, a first and a second field winding, said windings being electrically connected in parallel relation to one another.

The main exciter armature provides alternating current to a rotatably-mounted rectifier assembly. This assembly has its output connected to conduct direct current excitation to said synchronous machine rotor field winding. Also provided is a pilot exciter having a stator member carrying an armature winding and a rotor member being a permanent magnet. It must be understood that the dynamoelectric machines rotor member, the main exciter rotor member, and the pilot exciter permanent magnet are all connected to a common shaft for rotation.

According to the invention, a rectifier converts alternating current supplied from the pilot exciter armature winding to direct current which is delivered to the first field winding of the main exciter. This is the direct current base excitation. Another rectifier receives alternating current from a supplemental source and delivers direct current to a second field winding of the main exciter to provide forcing excitation.

It can therefore be seen that two different field windings for the main exciter are provided by the invention. The purpose of the first field winding is to provide a base voltage for small signal performance. In this mode, the excitation system is operating approximately linearly. The second field winding receives its power from a supplemental power source for transient forcing, either positive or negative, operation. The second field winding provides forcing excitation to permit operation of the generator at power levels which exceed the generator's base power output level.

A control signal proportional to a predetermined function of the field winding excitation and of power output of the generator is provided to control the magnitude and polarity of the supplemental excitation delivered by the second field winding.

This excitation arrangement not only permits operation of the synchronous generator at power levels which exceed its base power output level but also provides negative direct current excitation which allows fast de-excitation of the generator. In addition, it provides zero supplemental excitation when a generator is operating at its base power output level.

As noted above, the purpose of the second field winding of the main exciter is to provide a voltage forcing function for relatively large signal performance. An example of this type of performance is associated with system transient instabilities. During such transients, the supply voltage to the second field winding may be as high as 30 times larger than that supplied to the first field winding.

With this arrangement, at no time is the supplemental power source connected in series to the pilot exciter armature. This is in contradistinction to the earlier design. With the earlier series arrangement, the components in the excitation system had to be sized to handle the combined currents from pilot exciter armature and the supplemental power supply. By separating the large and small signals of the supplemental excitation system and connecting them in parallel, the currents are no longer as high. The advantage gained by this new arrangement is a reduction in the rating requirements of the components in the supplemental exciter circuitry, and therefore, a reduction in the mass of the supplemental excitation system.

While the invention has particular utility in supplementing the excitation provided to a synchronous generator, it is of general utility for any synchronous dynamoelectric machine having a rotating field winding which is excited by direct current.

BRIEF DESCRIPTION OF THE DRAWINGS

While the specification concludes with claims particularly pointing out and distinctly claiming that which is regarded as the present invention, the organization, advantages, and further objects of the invention may be readily ascertained from the following detailed description when read in conjunction with the accompanying drawings, in which:

DESCRIPTION OF THE PREFERRED EMBODIMENT

Throughout the description which follows, like reference characters refer to like elements on all figures.

Figure 1:
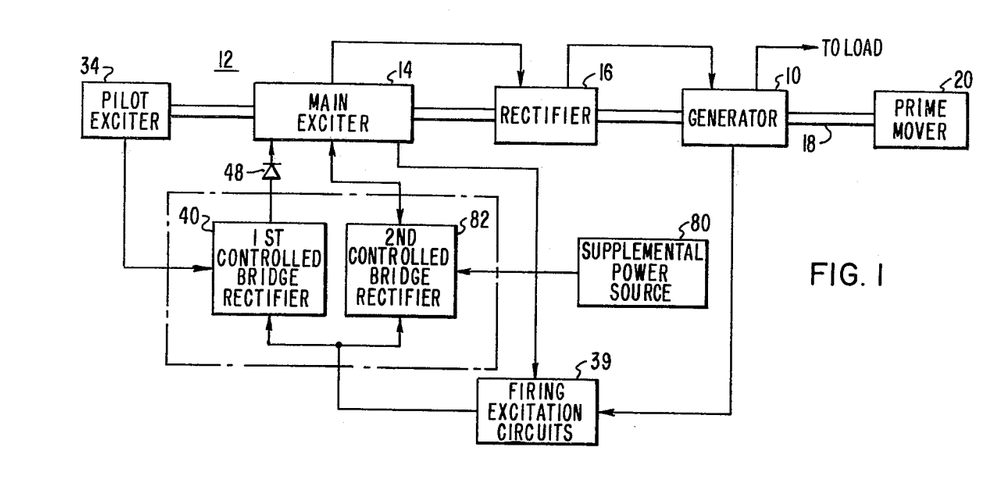
FIG. 1 is a block diagram of a synchronous generator and brushless excitation system which incorporates the present invention.
Figure 2:
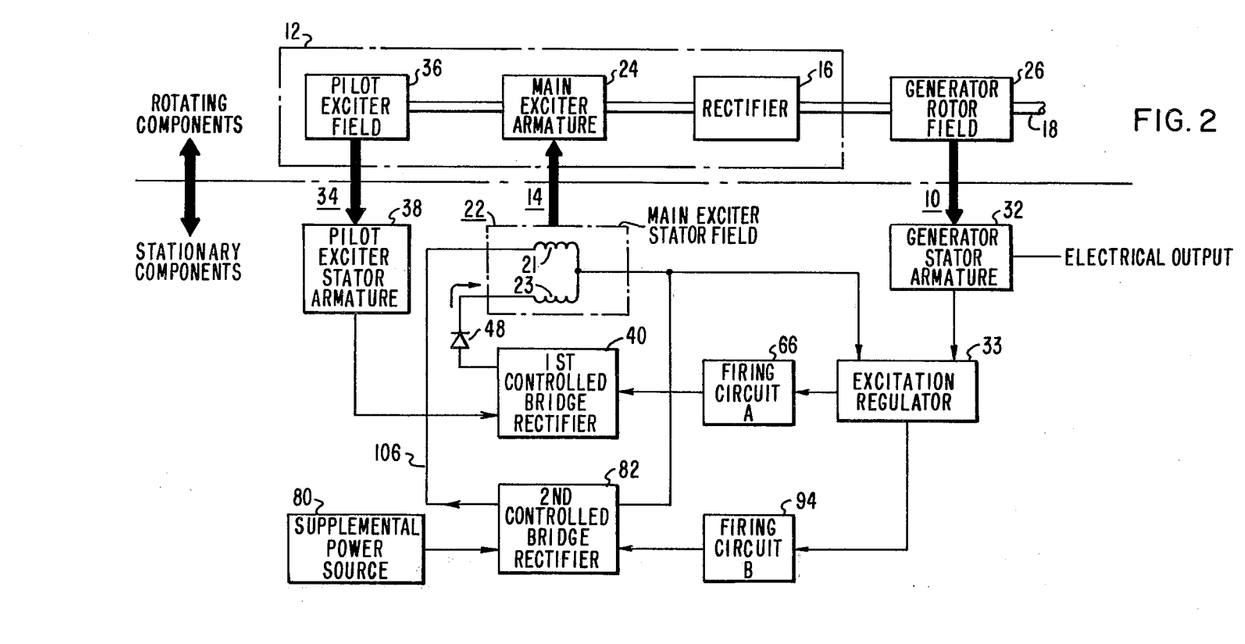
FIG. 2 is a block diagram which illustrates in more detail the features of FIG. 1.

Referring now to FIGS. 1 and 2, the invention is shown in combination with a synchronous dynamoelectric machine 10, such as a synchronous generator; and a brushless excitation system 12 having an alternating current exciter 14, and a rotating rectifier assembly 16 mounted on a common shaft 18 for concurrent rotation by a prime mover 20.

The alternating current exciter 14 may be of any suitable type having a stationary stator field member 22 and a rotating armature member 24. The armature member 24 of the exciter 14 comprises a three phase winding disposed in a core carried on the shaft 18 so as to be rotatable with the main rotor field winding 26 of the synchronous generator 10. The armature winding 24 is connected to the rotating rectifier assembly 16.

The rotating rectifier assembly 16 has a plurality of rectifiers 28 and fuses 30 connected in a bridge arrangement to provide direct current output for excitation of the field winding 26 of the generator 10. The direct current excitation flowing through the rotor field winding 26 establishes a magnetic field which induces current flow within a stator armature winding 32 of the synchronous generator 10 when the rotating components of the brushless excitation system are caused to rotate by the prime mover 20.

The main exciter 14 receives its field excitation from a pilot exciter 34 which includes a permanent magnet field member 36 mechanically connected to the shaft 18 for rotation by the prime mover 20. As the shaft 18 rotates, the permanent magnet field 36 is rotated within an annular armature winding member 38 in which alternating current is induced by magnetic induction in the usual manner. The output of the pilot exciter armature winding 38 is connected to a first controlled bridge rectifier assembly 40.

Figure 3:
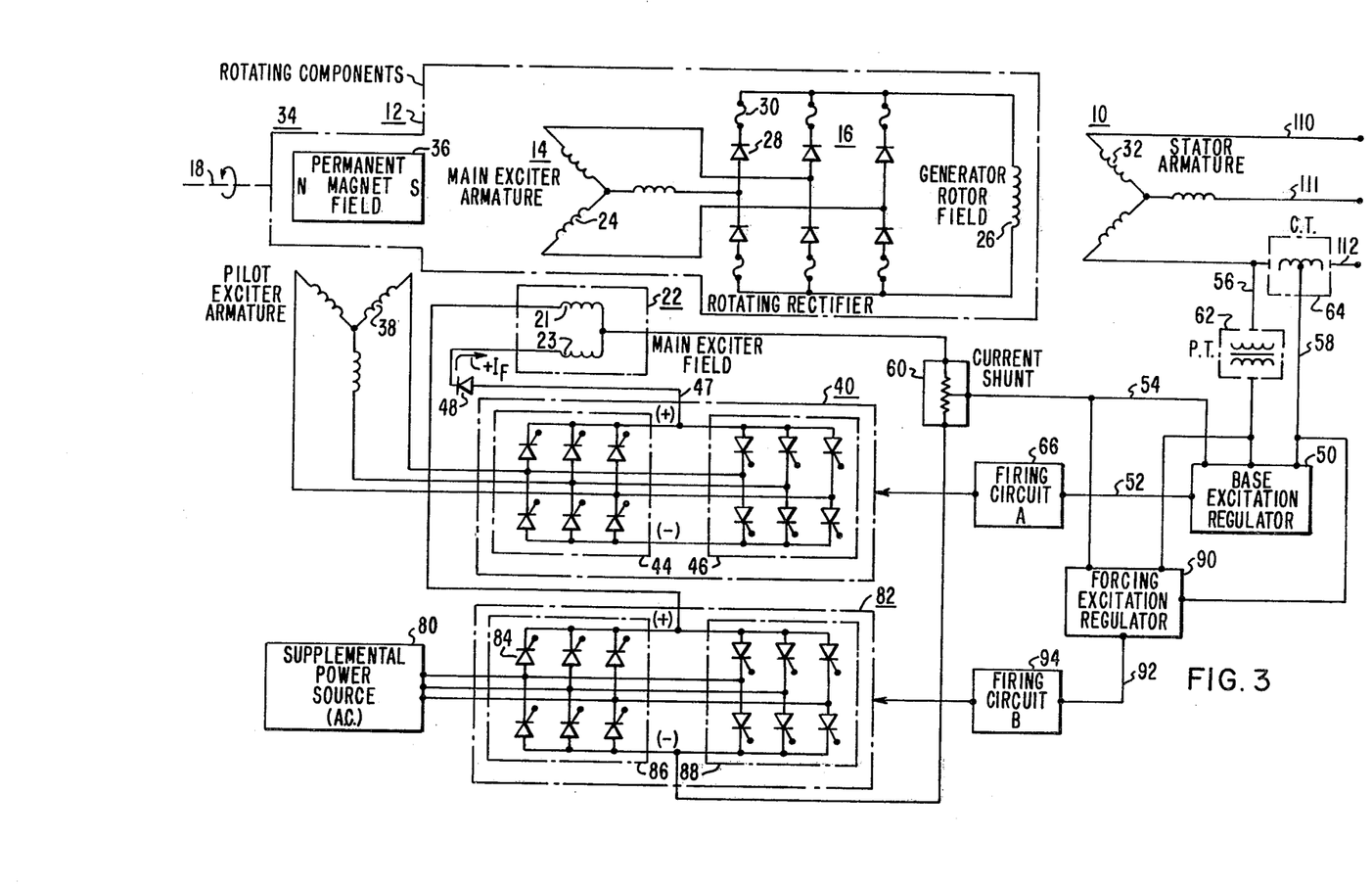
FIG. 3 is a circuit diagram which illustrates a preferred embodiment of the present invention in which supplemental excitation is derived from an alternating current power source.
Figure 4:
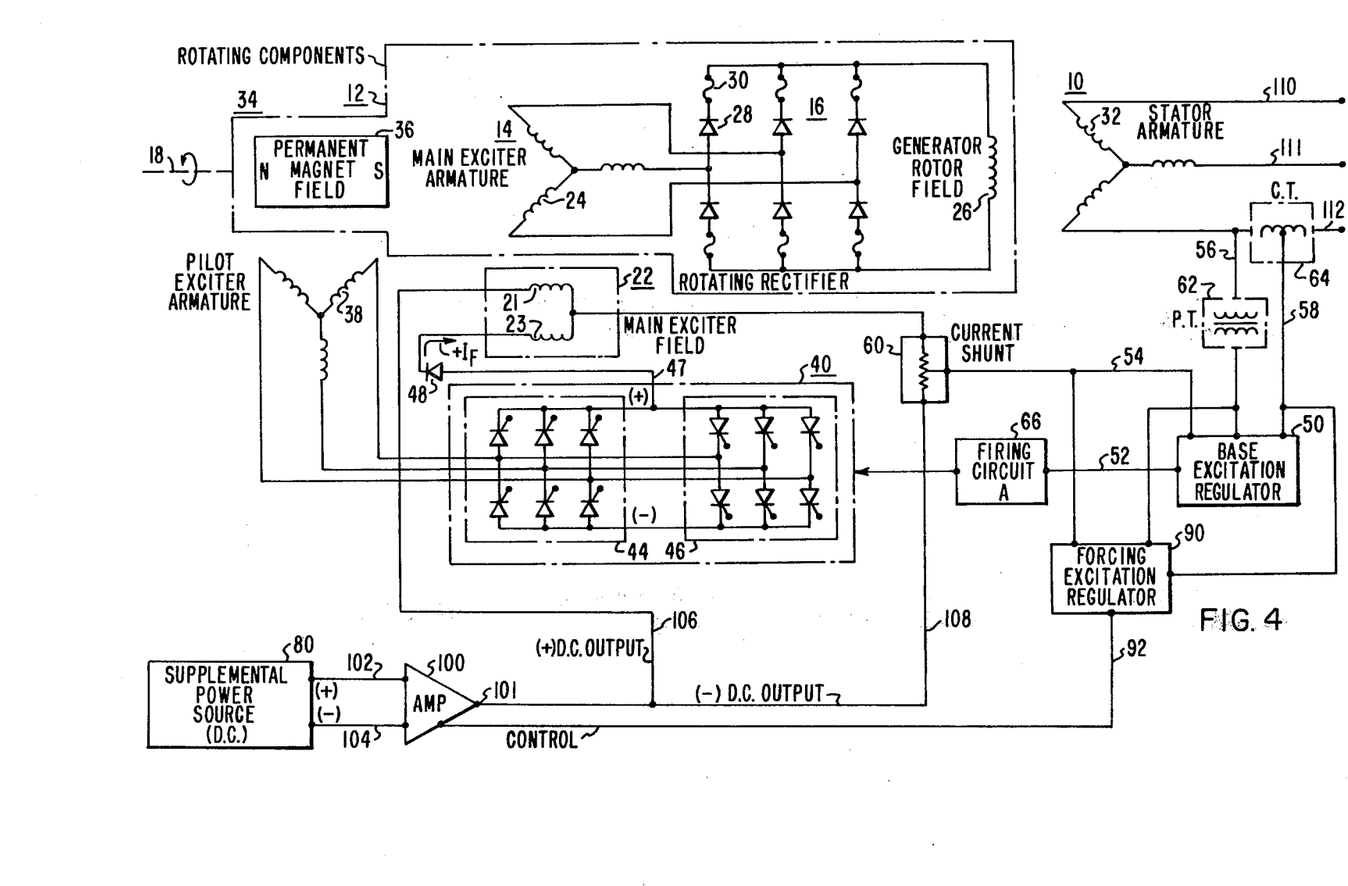
FIG. 4 is a circuit diagram which illustrates another embodiment of the present invention in which supplemental excitation is derived from a direct current power source.

Referring now to FIGS. 3 and 4, the first controlled bridge rectifier 40 includes a plurality of controlled rectifier elements 42 which are connected in a positive conducting bridge arrangement 44 and a negative conducting bridge arrangement 46. The controlled rectifier elements 42 of the positive conducting bridge group 44 are connected in a positive pole relation with respect to the output circuit 47 of the rectifier assembly 40 to conduct positive currents, $I_f$, (when gated on), from the pilot exciter armature winding 38 to main exciter stator field winding 22. Electrically connected between the output circuit 47 and said main exciter field 22 is a means for preventing current reversals, for example a diode 48, connected in positive conducting orientation. Said connecting diode 48 can be replaced by any electrical device which limits the current $I_f$ to non-negative values, i.e. protects the first control bridge rectifier assembly 40 from a current flow opposite from that shown by the arrow in FIG. 2. The controlled rectifier elements 42 of the negative conducting bridge group 46 are arranged in a negative pole relation with respect to the output circuit 47 of the rectifier 40. By this arrangement, the excitation power from the pilot exciter armature may be used in the usual manner for base excitation of the main exciter.

Referring now to FIGS. 2 and 3, the output of the control bridge rectifier assembly 40 is controlled by a base excitation regulator 50 which derives an output control signal 52 in response to a current signal 54 from the main exciter field winding 22. The voltage signal 56 from the synchronous generator stator armature winding 32, and current signal 58 are also derived from the stator armature winding 32. The current signal 54 may be completely derived from the current shunt 60 connected in series electrical relation with the main exciter field winding 22. Likewise, the voltage signal 56 may be derived by means of a potential transformer 62, and a current signal 58 may be derived by means of a current transformer 64, both being connected to one branch of the stator armature winding 32. The output signal 52 of the base excitation regulator 50 is generally proportional to a predetermined function of the level of excitation in the main exciter field circuit and of the power output of the synchronous generator. The control signal 52 is connected to a firing circuit 66 which is operable to selectively energize a predetermined combination of pairs of controlled rectifiers 42 within either the positive conducting bridge 44 or the negative conducting bridge 46 of the rectifier bridge 40. Specific circuits for performing these functions are well known and may be determined by reference to standard texts.

Figure 5:
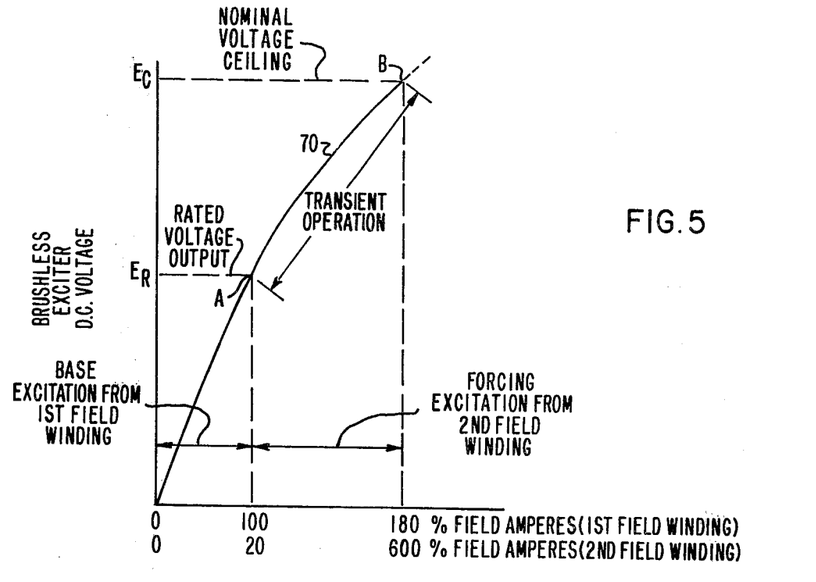
FIG. 5 is a graphical representation of a DC saturation curve for the main exciter of FIG. 1 in which the base excitation and forcing excitation zones are illustrated.

Referring now to FIG. 5, a DC saturation curve 70 of the main exciter is illustrated. Operating point A corresponds with the rated voltage output and 100% base excitation provided by the pilot exciter. The operating point B corresponds to the nominal ceiling voltage which is determined by the maximum voltage characteristics of the components of the rotating rectifier assembly. The portion of the curve below point A is considered the base excitation region. This excitation can be characterized as "small signal" excitation, and is supplied by the first field winding driven by the permanent magnet of the pilot exciter. A portion of the curve 70 between points A and B represents the transient operation of the main exciter during forcing excitation in response to loads which fluctuate above the base excitation level. As can be seen from the graph, the excitation in this operating range is a relatively large signal. According to the invention, this signal is supplied to the main exciter armature by a second field winding, energized by a supplemental power supply.

Figure 6:
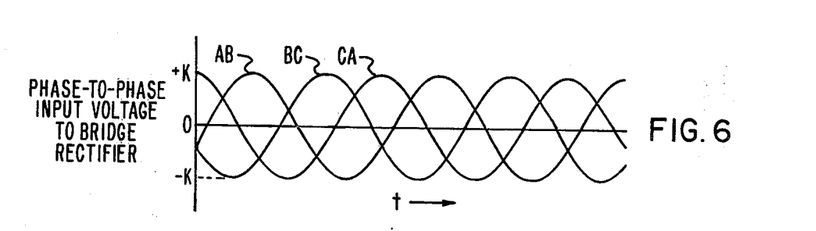
FIG. 6 is a graphical representation of the phase to phase input voltage of the bridge rectifiers of FIGS. 3 and 4.
Figure 7:
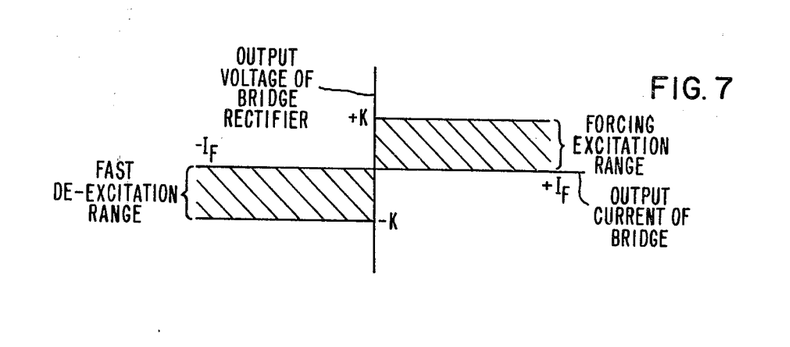
FIG. 7 is a graphical representation of the forcing excitation range and fast de-excitation range of the bridge rectifier circuits of FIGS. 3 and 4.

In FIGS. 6 and 7 of the drawings is shown typical input and output waveforms for the controlled bridge rectifier circuit. In FIG. 6, the phase to phase input voltage to the bridge rectifier is shown to be a three phase voltage having the generally symmetrical sinusoidal waveform and having an arbitrary positive and negative amplitude for the value K. In FIG. 7, the forcing excitation is seen to vary over a wide range of positive current output and voltage output at a maximum value K which generally corresponds with the amplitude of the input voltage to the bridge rectifier assembly.

Returning now to FIGS. 2 and 3, it should be understood that in the past it was common practice to provide the forcing excitation by means of a pilot exciter 34 alone. Now, according to the present invention, the forcing excitation for transient operation of the synchronous generator 10 is provided by supplemental power source 80 in cooperation with the pilot exciter 34. In the preferred circuit arrangement as illustrated in FIG. 3, the supplemental power source 80 provides three phase alternating current to a bridge rectifier circuit 82 which is substantially identical to the bridge rectifier arrangement 40 which is described above. A bridge rectifier arrangement 82 comprises a plurality of controlled rectifier elements 84 connected in a positive conducting bridge group 86, and a negative conducting bridge group 88. Operation of the bridge rectifier 82 is substantially the same as the operation of bridge rectifier 40 discussed above. However, the bridge rectifier 82 is connected in series electrical relation with a second field winding 21 of the main exciter stator field 22.

A forcing excitation regulator 90 provides a control signal 92 which corresponds to a predetermined function of the power output of the synchronous generator 10 and of the field excitation of the main exciter 14. The control signal 92 is connected to a firing circuit 94 which is operable to control the gating of the control rectifier elements 84 of the bridge rectifier circuit 82 in response to the control signal 92. The output of the control bridge rectifier assembly 82 is held to zero when the pilot exciter 34 is providing base excitation to the main exciter field winding 22 for rated voltage output. During forcing excitation operation, an appropriate control signal 92 is generated by the forcing excitation regulator 90 and causes the control rectifier 84 of the positive conducting bank 86 to conduct positive current to supplement excitation provided by the pilot exciter 34. When fast de-excitation is indicated, both the base excitation regulator 50 and the forcing excitation regulator 90 are operable to cause the associated firing circuit 94 to fire the negative conducting control rectifier elements 84 of the negative conducting bank 88 to conduct negative current for fast de-excitation of the main exciter field 22.

A supplemental AC power source 80 may be embodied by a transformer connected to terminals 92, 94, and 96 of the generator 10. In the alternative, the supplemental AC may be derived from any convenient source which operates independently of the main generator. The power supplied by the AC power source may be single-phase or poly-phase power of any convenient band frequency.

An alternative arrangement is illustrated in FIG. 4 in which the supplemental power source 80 is a DC power source which may be provided by a bank of batteries or through an inverter connected to an alternating power source. In this arrangement, the excitation deriving means comprises a controlled amplifier 100 which is operable to provide a variable DC output of positive or negative polarity at its output terminal 101 from a direct current input from the supplemental DC power source 80 and in response to the control signal 92 from the forcing excitation regulator 90. The control amplifier 100 has an input circuit 102, 104 which is connected to receive direct current excitation from the supplemental power source 80, and has an output circuit 106, 108 connected to supply direct current excitation to the main exciter field winding 22. The control amplifier 100 includes a control which is connected to receive the control signal 92 from the forcing excitation regulator 90. The output circuit 106 is electrically connected to the second field winding 21 of the main exciter field 22. As before, it can be seen, the output 47 of controlled rectifier circuit 40 (after it has proceeded through connecting diode 48) and the output 106 from the controlled amplifier 100, together with their associated exciter field windings, are essentially in parallel electrical relation.

The control amplifier 100 provides positive polarity direct current excitation output during the forcing mode of operation of the synchronous generator 10, provides substantially zero output during the base excitation mode of operation of the synchronous generator 10, and provides negative polarity direct current excitation during the fast excitation mode of operation of the synchronous generator 10.

Figure 8A:
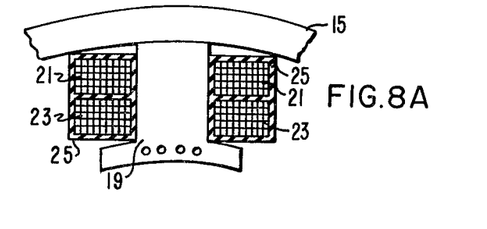
FIG. 8A is a schematic illustration of the two field windings of the main exciter, constructed in accordance with one embodiment of the invention.

FIG. 8A is a schematic in cross-section of the two field windings of the main exciter, constructed in accordance with one embodiment of the invention. Referring to the figures, both the first field winding 21 and the second field winding 23 are wound about each field pole 19 (only one of the poles is shown). The windings, in this embodiment, are electrically separated from one another and from the stator core 15 by insulation 25. Thus, the two windings share a common core. In FIG. 8A, one of the windings is wrapped so that each of its turns is below a turn of the other winding on the pole 19.

Figure 8B:
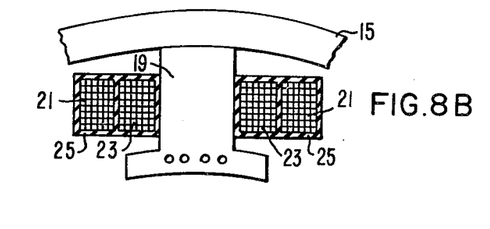
FIG. 8B shows an alternative embodiment to FIG. 8A in which the two field windings are concentrically wrapped, one around the other.

FIG. 8B shows an alternative embodiment to FIG. 8A. The two field windings are wrapped concentrically, one around the other.

Figure 9:
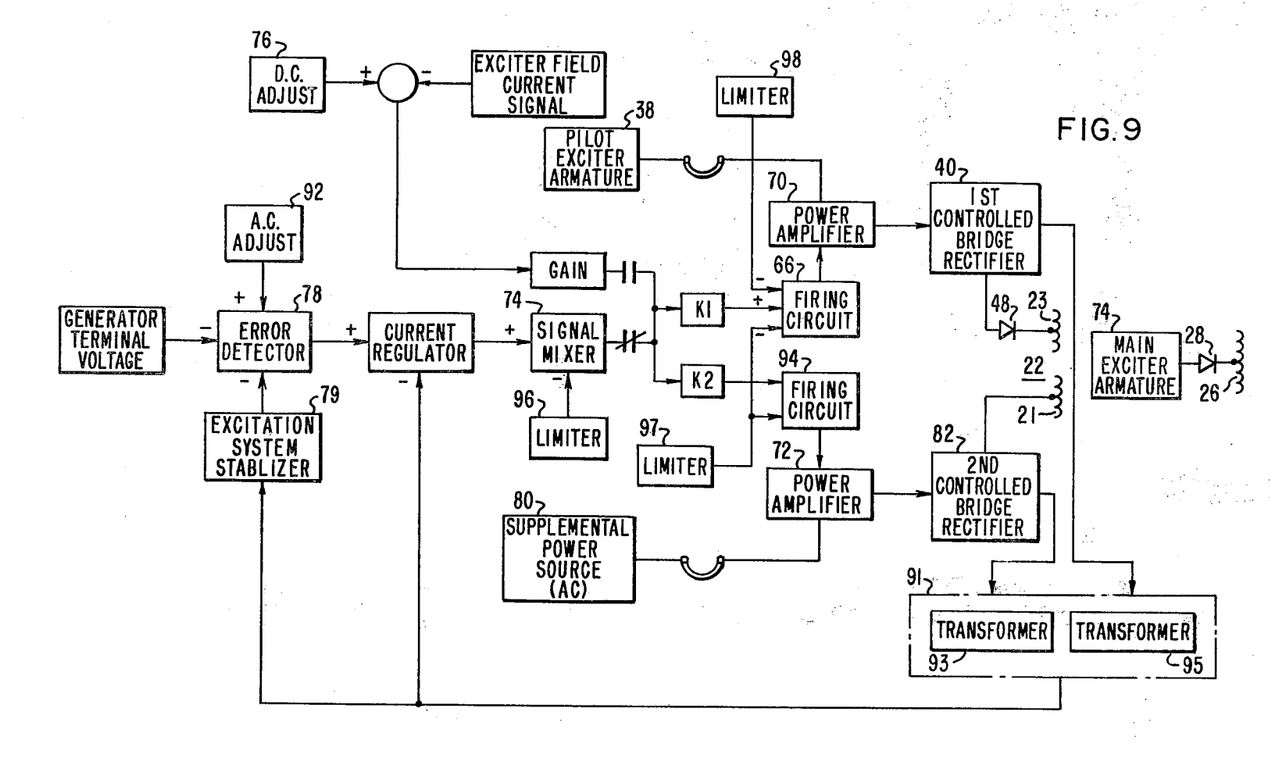
FIG. 9 is a detailed circuit diagram of yet another embodiment of the invention, showing further features of the control circuitry.

Referring to another embodiment of the invention as shown in FIG. 9, this system employs two power amplifiers connected in parallel. In this system, however, a first power amplifier 70 is driven, for example, by a 420 Hz, 120 volt signal from the pilot exciter armature 38. A second power amplifier 72 is supplied, for example, by a 60 Hz, 420 volt (nominal) external AC source 80. By sizing the two power amplifiers the same, interchangeability can be enjoyed. However, the first power amplifier 70 may be sized smaller than the second power amplifier 72 to match the lower ratings from the pilot exciter armature 38. In this case, a diode 48 would be necessary to block the high forcing voltage when the second power amplifier 72 is called upon to force positive. The first power amplifier 70 is electrically connected between the pilot exciter armature 38 and the first control bridge rectifier 40. The second power amplifier 72 is electrically connected between a supplemental (external) power source 80 and the second control bridge rectifier 82.

This system employs two firing circuits controlling the power amplifiers. A first firing circuit 66 controls the first power amplifier 70, and the second firing circuit 94 controls the second power amplifier 72. Thus, the redundancy in this scheme is not in just the individual components, but in the total system supplying power to the exciter field.

The output of a voltage regulator signal mixer 74 is electrically connected to provide a signal to the firing circuits 66, 94 through separately adjustable gains, generally designated K1 and K2. Gain K1 is made larger than K2 to compensate for the higher inherent gain in the second power amplifier 72 due to the larger voltage of the supplemental power source 80. This allows the overall gain between the signal mixer 74 and the DC output of the power amplifiers to be approximately equivalent.

As shown in FIG. 9, a manual adjust 76 is provided to permit the setting of a DC setpoint to control signal gains. Thus it can be seen that two voltage regulators are provided, an automatic one and a manual one. The automatic voltage regulator reacts to set a new base and forcing excitation during transient conditions. The automatic regulator returns the excitation, at the end of the transient event, to a setpoint established by the DC manual adjust 76. Thus, this adjustment can fine tune the excitation signal.

An error detector 78 is provided to compare the frequency and signal level of the generator terminal voltage against the excitation characteristics as set by the AC adjust designated 92. An excitation system stabilizer circuit 94 is also provided; said stabilizer 94 having a time constant to delay by some minute increment in time the excitation signal received from the AC signal controller 91. The AC signal controller 91 is electrically connected to the rectifiers 40, 82. It determines whether the current in either field must be adjusted, as well as detecting any major disturbance or transience. It incorporates two current transformers 93, 95 to top the current off the fields. The signal from the stabilizer is supplied to the error detector 94. A plurality of current limiters 96, 97 and 98 are supplied to protect the excitation system. Limiter 96 is set to the nominal ceiling conditions, that is, 120% of name plate current. If the AC exciter field current exceeds this value, the excitation supplied to the generator is quickly reduced. Limiter 97 acts as a backup for limiter 96, to protect the excitation system in case limiter 96 should fail. Limiter 98 is connected between the first control bridge rectifier and the first firing circuit to protect the excitation system from excess current generated by the pilot exciter armature.

The behavior of the excitation system can best be understood by separating the discussion into two parts, one covering steady state behavior and another covering transient behavior.

The steady state behavior of this system is such that when both sources are in service they share the duty of supplying steady state current to the exciter field. The actual split in this current depends upon the voltage regulation of the pilot exciter versus the excitation from the supplemental power source, and the overall gain between the signal mixer and the power amplifier outputs. Since the regulation of the supplemental power source would most likely be better than that of the pilot exciter, it is expected that the external source would carry, for example, from $\frac{1}{2}$ to $\frac{3}{4}$ of the steady state current, with the pilot exciter supplying the rest. If either the pilot exciter or the supplemental power source is tripped or made inoperable, the other one would immediately supply all the required current to the exciter field.

The transient behavior of this system is such that when the voltage regulator calls upon the excitation system to force positive, such that both the first and second power amplifier go to their ceiling values, the second power amplifier will carry all the current, because of the larger external AC source voltage. When the exciter field current reaches its ceiling value, the current limiter senses this, and reduces the voltage regulator output signal. This in turn reduces the power amplifier output voltages. At this point the sources again share the load current. When the forcing signal is at negative ceiling, the load current (which may have been at ceiling values) will be diverted to the first power amplifier and the power exciter, until the current is forced back down to a steady state level. However, this would not require the pilot exciter to be rated to supply ceiling exciter field current because this current is quickly forced back down by the pilot exciter voltage. With the lower continuous current ratings of the pilot exciter, an additional current limiter in the first power amplifier and pilot exciter circuit, would be recommended so as to not overload the pilot exciter during forcing conditions when the external AC source is out of service.

As can be seen from FIG. 5, the excitation voltage during base excitation is approximately linear. Because of this the dynamic behavior of this system will be similar to that of a conventional brushless system. Even with the external AC source out of service, the small signal behavior of this system will have a low effective exciter time constant because the transient time constant compensation is still acting.

It is therefore apparent that a relatively simple, supplemental excitation circuit is provided which operates independently of the pilot exciter to provide forcing excitation or fast de-excitation as needed. In case of a pilot exciter failure, the supplemental power source may be quickly switched to provide base excitation as well as some forcing excitation, and thereby provide a redundant feature for higher generator availability and greater overall reliability. Those skilled in the art will recognize that the speed of response of this excitation scheme is extremely fast because of the fast switching characteristics of the controlled rectifiers employed in the controlled rectifier bridge assemblies. Because the output of the controlled rectifier assemblies may be positive or negative, the supplemental power source may be employed during fast de-excitation of the main generator.

While a particular embodiment of the invention has been shown and described for purpose of illustration, other arrangements and embodiments may be practiced by those skilled in the art without departing from the scope and spirit of the invention. It is not desired, therefore that the invention be limited to this specific arrangement described herein.

What we claim is:

1. In combination, a synchronous dynamoelectric machine having a stator member carrying an alternating current armature winding and a rotor member carrying a direct current field winding;

a main exciter for said synchronous dynamoelectric machine having a rotor member carrying an armature winding, and a stator member having both a first and a second field winding, said first and said second field windings connected in parallel electrical relation to one another;

a rotatable rectifier assembly having an input circuit connected to receive alternating current power from said main exciter armature, and an output circuit connected to conduct direct current excitation through said synchronous machine rotor field winding;

a pilot exciter having a stator member carrying an armature winding and a permanent magnet rotor member, said pilot exciter being connected electrically in series with said first field winding;

means mechanically connecting said dynamoelectric machine rotor member, said rotatable rectifier assembly, said main exciter rotor member, and said pilot exciter permanent magnet rotor member for rotation;

means for converting alternating current to direct current having an input circuit connected to receive electrical power from said pilot exciter armature winding and having an output circuit connected to supply direct current to said first field winding of said main exciter;

means for deriving direct current excitation from a supplemental power source, said deriving means having an input circuit connected to receive electrical power from said supplemental power source and having an output circuit connected to supplement the direct current excitation applied to said second field winding of said main exciter, said supplemental power source being connected electrically in series with said second field winding and electrically independent of said dynamoelectric machine; and whereby said pilot exciter and said supplemental power source are connected electrically in parallel to and regulated independently of each other.

2. The combination of claim 1 further comprising a means for preventing current reversal, said means electrically connected between said output circuit of said converting means and said first field winding of said main exciter.

3. The combination as defined in claim 1 wherein said converting means and said deriving means each comprise a plurality of controlled rectifier elements electrically connected in a bridge arrangement, said controlled rectifier elements being connected in a positive pole relation with respect to the output circuit of said bridge to conduct positive current, when gated on, from its associated power source to said main exciter field winding.

4. The combination as defined in claim 3 including means for deriving a first control signal proportional to the main exciter field excitation and to the power output of said synchronous dynamoelectric machine, said first control signal being operably connected to said converting means to control the gating of said controlled rectifier elements of said converting means in response to said first control signal; and means for deriving a second control signal which corresponds to a predetermined function of the power output of said generator and of the main exciter field excitation, the output of said second control means being operably connected to said deriving means to control the gating of said controlled rectifier elements and of said deriving in response to said second control signal.

5. The combination as defined in claim 2 wherein the means for preventing current reversal is a connecting diode.

6. The combination as defined in claim 1 wherein the first field winding and the second field winding are wrapped about a common core.

7. In combination, a synchronous dynamoelectric machine having a stator member carrying an alternating current armature winding and a rotor member carrying a direct current field winding;

a main exciter for said synchronous dynamoelectric machine having a rotor member carrying an armature winding, and a stator member having both a first and a second field winding said first and said second field windings connected in parallel electrical relation to one another;

a rotatable rectifier assembly having an input circuit connected to receive alternating current power from said main exciter armature, and an output circuit connected to conduct direct current excitation through said synchronous machine rotor field winding;

a pilot exciter having a stator member carrying an armature winding and a permanent magnet rotor member;

means for mechanically connecting said dynamoelectric machine rotor member, said rotatable rectifier assembly, said main exciter rotor member, and said pilot exciter permanent magnet rotor member for rotation;

means for converting alternating current to direct current having an input circuit connected to receive electrical power from said pilot exciter armature winding and having an output circuit connected to supply direct current to said first field winding of said main exciter;

means for deriving direct current excitation from a supplemental power source, said deriving means having an input circuit connected to receive electrical power from said supplemental power source and having an output circuit connected to supplement the direct current excitation applied to said second field winding of said main exciter;

means for deriving a first control signal proportional to the main exciter field excitation and to the power output of said synchronous dynamoelectric machine, said first control signal being operably connected to said converting means to control the gating of said controlled rectifier elements of said converting means in response to said first control signal; means for deriving a second control signal which corresponds to a predetermined function of the power output of said generator and of the main exciter field excitation, the output of said second control means being operably connected to said deriving means to control the gating of said controlled rectifier elements and of said deriving in response to said second control signal; and said converting means and said deriving means each comprising a plurality of controlled rectifier elements electrically connected in a bridge arrangement, said controlled rectifier elements being connected in a positive pole relation with respect to the output circuit of said bridge to conduct positive current, when gated on, from its associated power source to said main exciter field winding.

* * * * *